US011757371B1

(12) United States Patent
Marwali et al.

(10) Patent No.: US 11,757,371 B1
(45) Date of Patent: Sep. 12, 2023

(54) PULSE-WIDTH MODULATION FOR HIGH-EFFICIENCY POWER CONVERSION

(71) Applicant: Rivian IP Holdings, LLC, Irvine, CA (US)

(72) Inventors: Mohammad Nanda Marwali, Irvine, CA (US); Muhammad Mobeen Mahmood, Irving, TX (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 17/879,562

(22) Filed: Aug. 2, 2022

(51) Int. Cl.
| | |
|---|---|
| *H02M 1/42* | (2007.01) |
| *H02M 7/219* | (2006.01) |
| *H02M 7/527* | (2006.01) |
| *H02M 7/5395* | (2006.01) |
| *H02M 7/217* | (2006.01) |

(52) U.S. Cl.
CPC ......... *H02M 7/527* (2013.01); *H02M 1/4258* (2013.01); *H02M 7/5395* (2013.01); *H02M 1/42* (2013.01); *H02M 7/217* (2013.01)

(58) Field of Classification Search
CPC ............ H02M 1/0003; H02M 1/0009; H02M 1/0038; H02M 1/32; H02M 1/42; H02M 1/4208; H02M 1/4216; H02M 1/425; H02M 1/4258; H02M 1/084; H02M 3/1588; H02M 7/02; H02M 7/12; H02M 7/155; H02M 7/1552; H02M 7/1555; H02M 7/162; H02M 7/21; H02M 7/217; H02M 7/219; H02M 7/527; H02M 7/5395; H02M 7/487; H02M 5/40; H02M 5/458; H02M 5/4585
See application file for complete search history.

(56) References Cited

U.S. PATENT DOCUMENTS

| | | | | |
|---|---|---|---|---|
| 2006/0221656 A1* | 10/2006 | Meguro | ................... | H02M 1/12 363/95 |
| 2013/0322139 A1* | 12/2013 | Lee | ........................ | H02M 7/797 363/84 |
| 2016/0190907 A1* | 6/2016 | Ayana | ................. | H02M 5/4585 363/37 |
| 2016/0268917 A1* | 9/2016 | Ramsay | ............ | H02M 7/53871 |

(Continued)

FOREIGN PATENT DOCUMENTS

EP        1780882 A1 *  5/2007    ..........  H02M 5/4585

OTHER PUBLICATIONS

Charumit, C. et al. (Apr. 2015). "Discontinuous SVPWM Techniques of Three-Leg VSI-Fed Balanced Two-Phase Loads for Reduced Switching Losses and Current Ripple," IEEE Transactions on Power Electronics, vol. 30, No. 4.

*Primary Examiner* — Thienvu V Tran
*Assistant Examiner* — Shahzeb K Ahmad
(74) *Attorney, Agent, or Firm* — MORRISON & FOERSTER LLP

(57) ABSTRACT

Methods, circuits, and devices for power conversion are disclosed. In some embodiments, the device comprises a circuit comprising a first, second, and third leg. Each leg may comprise two switches. The first leg is switched at a first frequency to generate a first signal, and the second leg is switched at a second frequency lower than the first frequency to generate a second signal. The third leg is switched by a neutral leg control signal to generate a third signal. The circuit generates an output power signal (e.g., a split-phase power signal) based on the first signal, second signal, and the third signal.

20 Claims, 10 Drawing Sheets

(56) References Cited

U.S. PATENT DOCUMENTS

| | | | |
|---|---|---|---|
| 2019/0157986 A1* | 5/2019 | Ginart | H02M 3/158 |
| 2020/0070672 A1* | 3/2020 | Vahedi | H02M 7/219 |
| 2022/0227242 A1* | 7/2022 | Schafmeister | H02J 7/02 |

\* cited by examiner

US 11,757,371 B1

PULSE-WIDTH MODULATION FOR HIGH-EFFICIENCY POWER CONVERSION

INTRODUCTION

Generating a split-phase signal, which may be needed in North America to provide a higher voltage signal (e.g., 240V), may cause a high amount of power dissipation. For example, a high amount of switching power may be dissipated to generate a split-phase signal (e.g., a split-phase AC signal having a root mean square (RMS) voltage of 240V) because a power inverter for generating the signal may be switched at high frequencies. For example, the 240V RMS signal is obtained from two 120V RMS signals with opposite polarity (e.g., the two 120V RMS signals are complementary).

BRIEF SUMMARY

Methods, circuits, and devices for power conversion are disclosed. In some embodiments, the device comprises a circuit comprising a first, second, and third leg. Each leg may comprise two switches. The first leg is switched at a first frequency to generate a first signal, and the second leg is switched at a second frequency lower than the first frequency to generate a second signal. The third leg is switched by a neutral leg control signal to generate a third signal. The circuit generates an output power signal based on the first signal, second signal, and the third signal. In some embodiments, the output power signal is a split-phase signal. The third leg and the neutral leg control signal advantageously allow the generation of the third signal, which allows the second leg to switch at a lower frequency to generate the split-phase signal. Because the second leg is switched at a lower frequency, the disclosed methods, circuits, and devices may reduce power dissipation for generating a split-phase signal, and the second leg may comprise less costly devices. In some examples, because power dissipation is reduced (compared to an inverter that entirely switches at high frequencies to generate a split-phase signal), the corresponding device's thermal requirements may also be reduced (for example, heat sink size may be reduced).

The embodiments disclosed above are examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DETAILED DESCRIPTION

Figure 1:
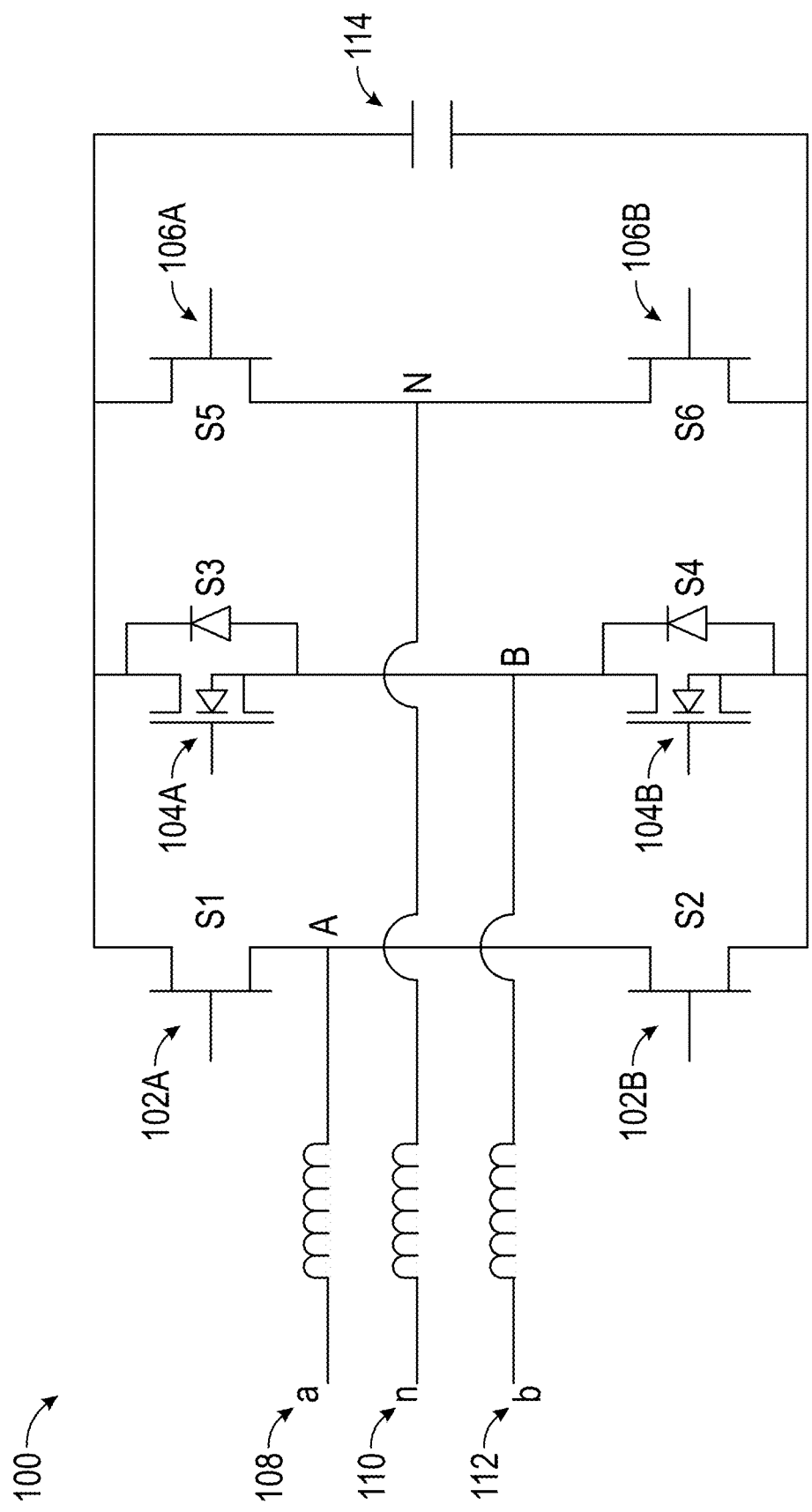
FIG. 1 illustrates an example circuit for generating an output power signal.

FIG. 1 illustrates an example circuit 100 for generating an output power signal. In some embodiments, the circuit 100 is part of a power inverter for generating a split-phase signal. In some embodiments, the power inverter is part of an electric vehicle (e.g., vehicle 800) for distributing power (e.g., providing a 240V and/or a 120V power signals from the vehicle). In some embodiments, the power inverter is separate from an electric vehicle. In some embodiments, the power inverter is configured for charging a battery (e.g., a battery of an electric vehicle (e.g., vehicle 800)). In some embodiments, the circuit 100 is configured to provide up to 7.33 kW of power.

As illustrated, the example circuit 100 comprises a first leg, which may comprise switches S1 and S2, a second leg, which may comprise switches S3 or S4, and a third leg, which may comprise switches S5 or S6. The first leg is configured to generate a first signal at node A in response to the signals 102A (controlling switch S1) and 102B (controlling switch S2) switching the first leg. The second leg is configured to generate a second signal at node B in response to the signals 104A (controlling switch S3) and 104B (controlling switch S4) switching the second leg. The third leg is switched by a neutral leg control signal 106A (controlling switch S5) and 106B (controlling switch S6) to generate a third signal at node N based on the switching pattern of the neutral leg control signal. Although the circuit 100 is described with respect to switches (and in some examples, transistors), it should be appreciated that S1-S6 may be other kinds of switching devices. One or more signals 102A, 102B, 104A, 104B, 106A, and 106B may be pulse-width modulated signals. The pulse widths of these signals are modulated to control respective switches, and together, the switches generate a desired output power signal (e.g., a split-phase AC signal having a RMS voltage of 240V across outputs 108 and 112, AC signals having a RMS voltage of 120V across outputs 108 and 110 and/or outputs 112 and 110). The generation of these signals are discussed in more detail below.

In some embodiments, the circuit 100 comprises a totem pole power factor correction (PFC) circuit comprising a first leg and a second leg, and a neutral leg (e.g., the third leg). The signals 102A and 102B may be first leg control signals. In some embodiments, the first leg control signals 102A and 102B are switching at a first frequency. For example, the first frequency is 1 kHz-10 MHz (switching at a frequency lower than 1 kHz may result in higher magnetics and/or filtering requirements). In some embodiments, the signals 102A and 102B are complementary signals (e.g., to prevent short-circuit current through a respective leg). The signals 104A and 104B may be second leg control signals. In some embodiments, the second leg control signals are switching at a second frequency (e.g., 60 Hz (e.g., in the U.S.), 50 Hz, fundamental frequency of a desired output power signal, fundamental frequency of a power system). In some embodiments, the signals 104A and 104B are complementary signals (e.g., to prevent short-circuit current through a respective leg, to reduce short-circuit current through a respective leg). In some embodiments, the first frequency is higher than the second frequency (e.g., by a factor of 15-200000). The signals 106A and 106B may be neutral leg control signals. In some embodiments, the neutral leg control signals are switching at 1 kHz-10 MHz. In some embodiments, the neutral leg control signals are switching at the first frequency (of signals 102A and 102B). In some embodiments, the signals 106A and 106B are complementary signals (e.g., to prevent short-circuit current through a respective leg). As explained in more detail herein, controlling the neutral leg with a neutral leg control signal allows the second leg to be switched at lower frequencies, reducing switching power dissipation when generating a desired output power signal (e.g., a split-phase AC signal having a RMS voltage of 240V AC signals across outputs 108 and 112 and having a RMS voltage of 120V across outputs 108 and 110 and/or outputs 112 and 110) and allowing the second leg to comprise less costly devices (e.g., a MOSFET, Silicon-based switch instead of a wide bandgap switch). In some examples, because power dissipation is reduced (compared to an inverter that entirely switches at high frequencies to generate a split-phase signal), the corresponding device's thermal requirements may also be reduced (for example, heat sink size may be reduced).

In some embodiments, switches S1 and S2 are switches of a first type, and the switches of the first type are configured to switch at the first frequency. For example, the first type of switches may be a wide-band-gap semiconductor device, such as a switch comprising Gallium Nitride, Silicon Carbide, a wide bandgap semiconductor, or combination thereof, which may be configured to switch at the first leg control signal frequencies. In some embodiments, the first type of switches is a silicon switch (e.g., a silicon leg transistor). In some embodiments, switches S3 and S4 are switches of a second type, and the switches of the second type are configured to switch at the second frequency. For example, the second type of switches may be metal-oxide-semiconductor field effect transistor (MOSFET), insulated-gate bipolar transistor (IGBT), or any combination thereof, which may be configured to switch at a second leg control signal frequencies. As explained herein, the circuit 100 and methods of operating circuit 100 allow the second leg to be switched at a lower frequency, allowing slower devices such as MOSFET to be used for generating the output power signal and reducing cost for fabricating the circuit. In some embodiments, switches S5 and S6 are switches of a third type, and the switches of the third type are configured to switch at the neutral leg control signal frequencies. For example, the third type of switches may be switches comprising Gallium Nitride, Silicon Carbide, or combination thereof, which may be configured to switch at the neutral leg control signal frequencies.

In some embodiments, nodes A, B, and N are each electrically coupled to an inductor to the outputs 108, 110, and 112, respectively. The inductors are configured to reduce current spikes from nodes A, B, and N to an output of the circuit 100. In some embodiments, capacitors are coupled to outputs 108, 110, and 112 to smooth the output voltages.

In some embodiments, the output power signal (e.g., voltage across outputs 108 and 112) is generated based on the first signal (e.g., signal at node A), second signal (e.g., signal at node B), and the third signal (e.g., signal at node N). For example, the output power signal is a superposition of the first signal, second signal, and third signal. As a specific example, the output power signal is a split-phase AC signal having a RMS voltage of 240V, the signal between outputs 108 and 110 is an AC signal having a RMS voltage of 120V at a first phase, and the signal between outputs 110 and 112 is an AC signal having a RMS voltage of 120V at a second phase. The signal between outputs 108 and 110, and the signal between outputs 110 and 112 may be anti-phase, and the superposition of these two signals allow the split-phase signal to be formed.

In some embodiments, the circuit 100 comprises a capacitor 114 configured to receive and store a DC voltage (to be converted to an AC signal at output of the circuit 100). For example, the DC voltage is 350V (e.g., 240V×sqrt(2)=339V plus margin for overcoming voltage drops across devices and inductors) or higher. The DC voltage is received as an input by the switches S1-S6 (e.g., at their respective source or drain terminals). Although the circuit 100 is described with respect to power inverter functions (e.g., converting a DC voltage to a split-phase power signal), it should be appreciated that the circuit 100 may also perform rectification (e.g., converting an AC signal into a DC signal), for example, by receiving an AC signal across the ports 108 and 112, and providing a DC signal across the capacitor 114. In some embodiments, while performing rectification, switches S5 and S6 may be idle (e.g., off, not conducting). Compared to a bidirectional totem pole circuit comprising two legs, the circuit 100 advantageously may be configured to both perform rectification and generate a split-phase signal (e.g., obtaining a 240V RMS signal from two 120V RMS signals with opposite polarity). In some embodiments, the circuit 100 is configured to provide up to 7.33 kW of power while performing rectification.

In some embodiments, a power inverter comprises three circuits 100. Because the circuit 100 may perform power inversion and rectification, some of the circuits 100 in the power inverter may perform power inversion while other circuits 100 in the power inverter may perform rectification. For example, two of the circuits 100 may be configured for rectification (e.g., to provide a DC voltage for charging a battery), and one of the circuits 100 may be configured for rectification and power inversion (e.g., to export power), allowing simultaneous charging and inverting to occur.

Although the circuit 100 is described with the illustrated components, it should be appreciated that the circuit illustrated in FIG. 1 is exemplary. It should be appreciated that the circuit 100 may comprise additional, different, and/or fewer components than described. For example, a leg of the circuit 100 may comprise more than two switches in series to generate a signal of the leg. As another example, a leg of the circuit 100 may be controlled by more than two signals (e.g., in addition to complementary signals controlling two switches). As another example, the circuit 100 may comprise more than three legs, such that the output power signal of the circuit is the superposition of signals generated at each leg (and the control signals are adjusted accordingly).

Figure 2:
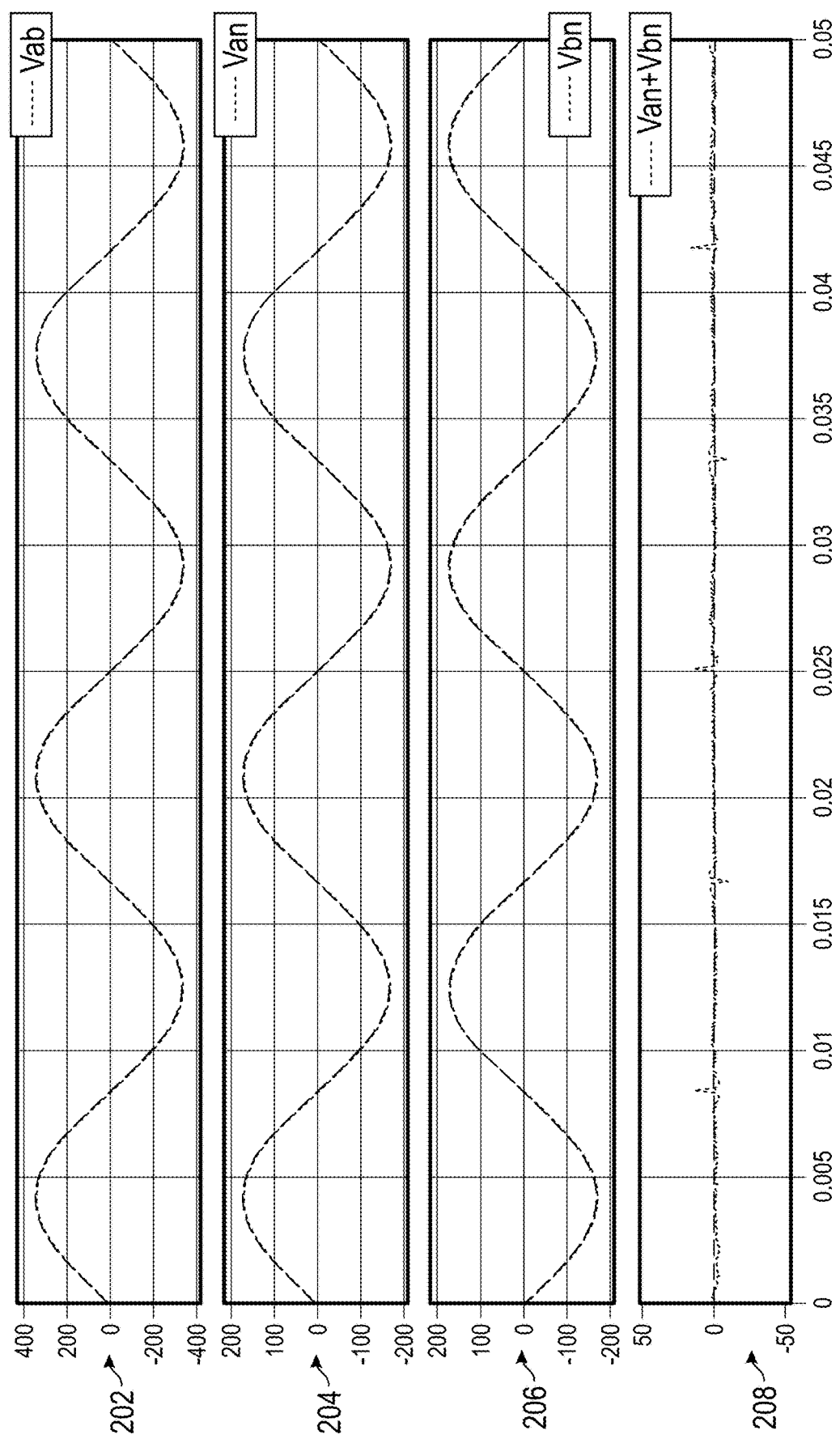
FIG. 2 illustrates example waveforms of a circuit for generating an output power signal.

FIG. 2 illustrates example waveforms of a circuit for generating an output power signal. For example, FIG. 2 illustrates example waveforms of circuit 100. Waveform 202 is a waveform of the output power signal of circuit 100 (e.g., $V_{ab}$, voltage across outputs 108 and 112), and the output power signal is a split-phase AC signal having a RMS voltage of 240V. Waveform 204 is a waveform of the voltage across output 108 and 110 (e.g., $V_{an}$), which may be a 120V RMS AC signal, as illustrated. Waveform 206 is a waveform of the voltage across output 112 and 110 (e.g., $V_{bn}$), which may be a 120V RMS AC signal, as illustrated. Waveform 208 is a sum of (1) the voltage across outputs 108 and 110 (e.g., $V_{an}$) and (2) the voltage across outputs 112 and 110 (e.g., $V_{bn}$). In some embodiments, this sum is 0V, as illustrated. From these waveforms, it can be seem that if $V_{an}+V_{bn}=0$, then the $V_{an}$ and $V_{nb}$ may be superimposed to generate the 240V RMS split-phase AC signal.

Figure 3:
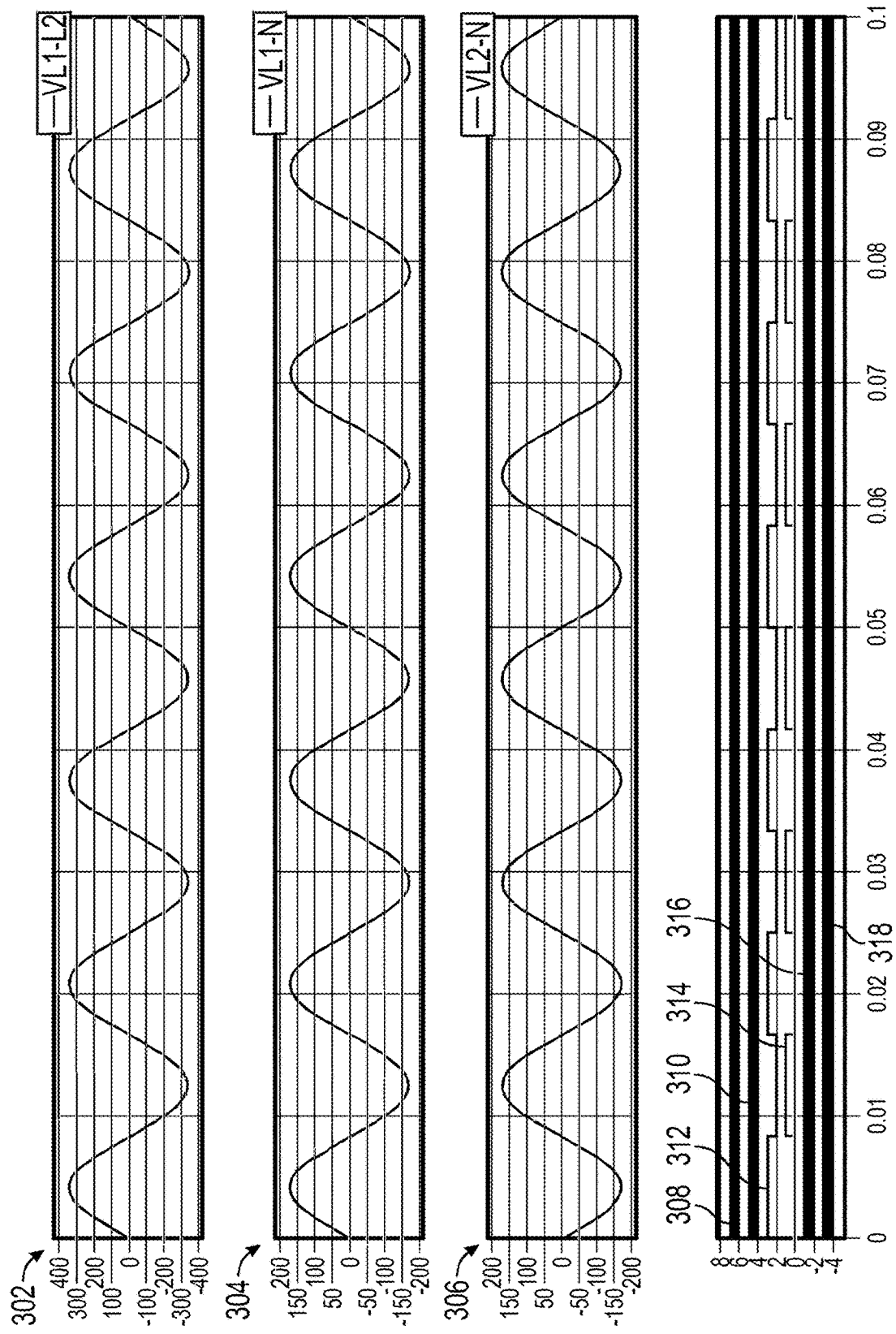
FIG. 3 illustrates example waveforms of a circuit for generating an output power signal.

FIG. 3 illustrates example waveforms of a circuit for generating an output power signal. For example, FIG. 3 illustrates example waveforms of circuit 100. Waveform 302 is a waveform of the output power signal of circuit 100 (e.g., $V_{ab}$), and the output power signal is a split-phase AC signal having a RMS voltage of 240V. Waveform 304 is a waveform of the voltage across output 108 and 110 (e.g., $V_{an}$), which may be a 120V RMS AC signal, as illustrated. Waveform 306 is a waveform of the voltage across output 112 and 110 (e.g., $V_{bn}$), which may be a 120V RMS AC signal, as illustrated.

In some embodiments, waveforms 308 and 310 are waveforms of signals 102A and 102B, waveforms 312 and 314 are waveforms of signals 104A and 104B, and waveforms of signals 106A and 106B. The signals 102A and 102B are switched according to waveforms 308 and 310 to control the first leg of the circuit 100 and generate the voltage at node A. The signals 104A and 104B are switched according to waveforms 312 and 314 to control the second leg of the circuit 100 and generate the voltage at node B. The signals 106A and 106B are switched according to waveforms 314 and 316 to control the neutral leg of the circuit 100 and generate the voltage at node N. By generating signals at nodes A, B, and N according to these waveforms, the waveforms 304 and 306 may be generated, and the waveforms may be superimposed to the desired output power signal.

As illustrated, it can be seen that the waveforms 312 and 314 are switching at lower frequencies (e.g., frequency of the output power signal), compared to e.g., waveforms 308 and 310. Controlling the third leg with a neutral leg control signal (e.g., following waveforms 316 and 318) allows the second leg to be switched at lower frequencies, reducing switching power dissipation when generating a desired output power signal (e.g., a split-phase AC signal having a RMS voltage of 240V).

Figure 4:
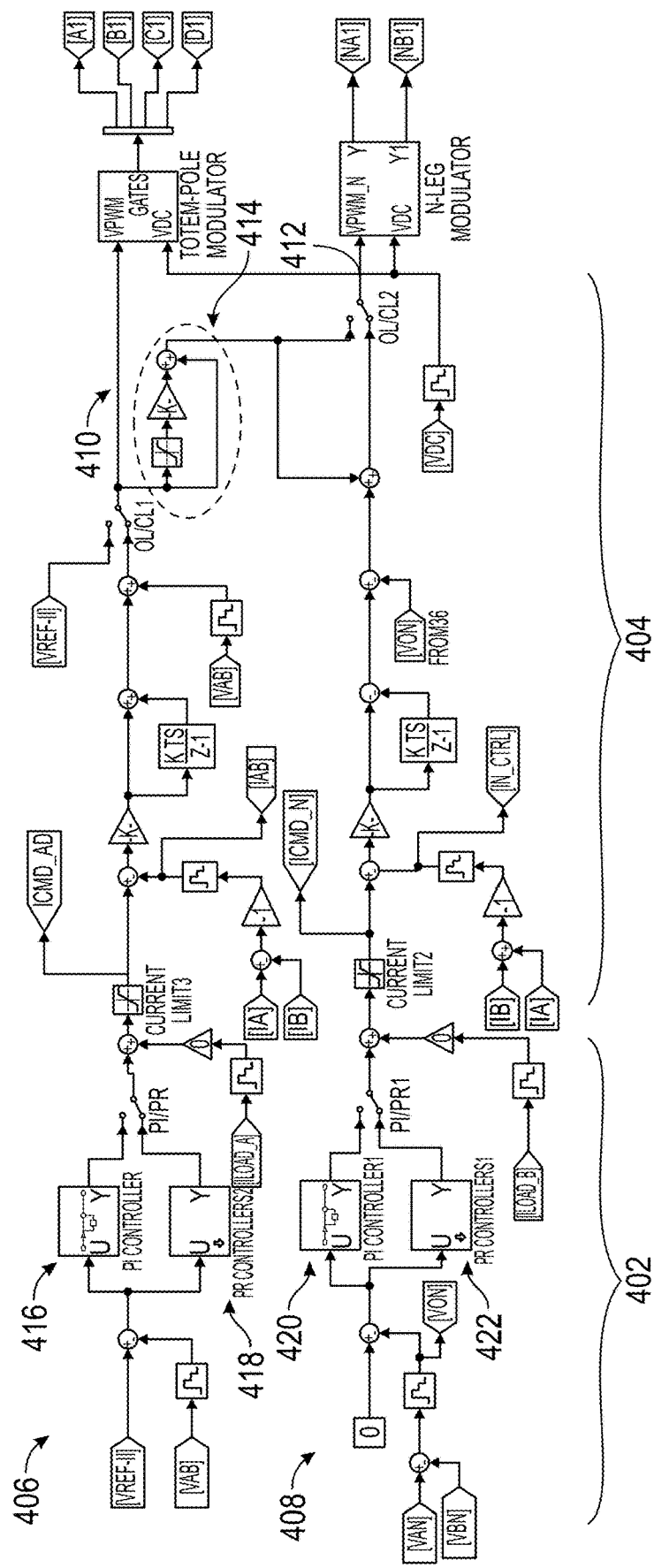
FIG. 4 illustrates an example diagram of a control loop for controlling a circuit for generating an output power signal.

FIG. 4 illustrates an example diagram of a control loop for controlling a circuit for generating an output power signal. In some embodiments, the control loop is configured to generate pulse-width modulated signal for controlling circuit 100 to generate an output power signal. In some embodiments, the control loop is used to enforce voltage conditions for generating the output power signal. For example, the voltage conditions are that (1) $V_{an}-V_{bn}$ follows the reference voltage (e.g., 240V RMS) and (2) $V_{an}+V_{bn}=0V$ (as described with respect to FIG. 2).

For example, to enforce these voltage conditions, the control loop is configured to generate signals 102A, 102B, 104A, 104B, 106A, and 106B for controlling circuit 100 and generating an output power signal corresponding to these conditions. As illustrated, signal 102A may be provided at port A1, signal 102B may be provided at port B1, signal 104A may be provided at port C1, signal 104B may be provided at port D1, signal 106A may be provided at port NA1, and signal 106B may be provided at port NB1.

In some embodiments, the control loop comprises voltage control loop 402 and current control loop 404. The voltage control loop 402 may comprise sections 406 and 408. The section 406 may be configured to enforce the first voltage condition ($V_{an}-V_{bn}$ follows the reference voltage), and may comprise a Proportional-Integral (PI) controller 416 and/or a Proportional-Resonant (PR) controller 418. One or more of the PI and PR controller may be used to enforce the condition $V_{an}-V_{bn}$ following the reference voltage (e.g., 240V RMS). The voltage $V_{an}-V_{bn}$ (e.g., $V_{ab}$, voltage across output 108 and 112) may be provided and compared to reference voltage VREF (e.g., a sine voltage signal at 240V RMS). VREF may be a reference voltage corresponding to a desired output voltage (e.g., a split-phase AC signal having a RMS voltage of 240V) of the circuit 100. The difference between ($V_{an}-V_{bn}$) and VREF may be provided to the PI and/or the PR controllers. The PI controller 416 and/or the PR controller 418 are configured to provide a signal for generating pulse-width modulated signals at ports A1, B1, C1, D1 via the totem-pole modulator, and for generating pulse-width modulated signals at ports NA1 and NB1 via neutral leg modulation function 414 and the N-leg modulator. For example, the neutral leg modulation function may be:

$$Vpwm\_n=(Vpwm\_ab/Vdc)-\text{sign}(Vpwm\_ab) \qquad (1)$$

Where Vpwm_ab may be a line-to-line pulse-width modulation voltage (e.g., VPWM signal 410), Vdc is a measured DC bus voltage, and sign(Vpwm_ab) is a polarity of the line-to-line pulse-width modulation voltage. The function may be chosen such that combining the neutral leg signal (the third signal of the third leg, controlled by the neutral leg control signal generated via the N-leg modulation function) with the totem-pole modulation of first and second legs would result in the desired output voltages at AN, BN, and AB (e.g., AN=−BN and AB=2×AN).

The current control loop 404 may comprise PI controllers (as shown), dead-beat controllers, discrete sliding mode controllers, hysteretic controllers, or any combination thereof.

The section 408 may be configured to enforce the second voltage condition ($V_{an}+V_{bn}=0V$), and may comprise a PI controller 420 and/or a PR controller 422. One or more of the PI and PR controller may be used to enforce the condition $V_{an}+V_{bn}=0V$. The voltages $V_{an}$ (e.g., voltage across outputs 108 and 110) and $V_{bn}$ (e.g., voltage across outputs 112 and 110) may be provided. The sum of $V_{an}$ and $V_{bn}$ may be provided to the PI and/or the PR controllers. The PI controller 420 and/or the PR controller 422 are configured to provide a signal for generating pulse-width modulated signals at ports NA1 and NB1 via the N-leg modulator.

For example, the totem-pole modulator may receive VPWM signal 410 (which is generated based on an output of the PI controller 416 and/or PR controller 418) at a first input of the totem-pole modulator and compare the VPWM signal 410 with a carrier signal VDC (e.g., a sawtooth signal at 50% duty cycle switching at 1 kHz-10 MHz) at a second input of the totem-pole modulator to generate signals at ports A1 and B1 (e.g., signals 102A and 102B) for controlling the first leg. The totem-pole modulator may generate signals at a fundamental frequency (e.g., square waves at 50% duty cycle switching at 60 Hz) at ports C1 and D1 (e.g., 104A and 104B) for controlling the second leg. The signals 104A and 104B may be obtained based on the polarity of the VPWM signal 410. For example, a high or low value for the signals 104A and 104B is outputted based on the polarity of the VPWMN signal, resulting the signals 104A and 104B switching at the fundamental frequency (e.g. 60 Hz).

The N-leg modulator may receive VPWM_N signal 412 (which is generated based on (1) an output of the neutral leg modulation function 414 or (2) an output of the PI controller 420 and/or PR controller 422) at a first input of the N-leg modulator and compare the VPWM_N signal 412 with the carrier signal VDC at a second input of the N-leg modulator to generate signals at ports NA1 and NB1 (e.g., signals 106A and 106B). The OL/CL2 switch may control which of (1) or (2) to provide the VPWM_N signal 412. Signal (1) may be provided to the VPWM_N signal 412 if open loop control is desired. If open loop control is desired, the OL/CL1 switch may cause VREF_II to be provided to the neutral leg modulation function 414. Signal (2) may be provided to the VPWM_N signal 412 if closed loop control is desired. The switches OL/CL1 and OL/CL2 may be selected synchronously to achieve open loop and closed loop control.

The pulse-width modulated signals ports A1, B1, C1, D1, NA1, and NB1 are configured to minimize the difference between ($V_{an}$–$V_{bn}$) and VREF (first voltage condition) and to minimize the difference between $V_{an}$+$V_{bn}$ (second voltage condition) (e.g., to zero). Because these pulse-width modulated signals satisfy these voltage conditions, using these signals to control circuit 100 allow the circuit to output a voltage that tracks VREF. In some embodiments, the VREF may be updated to cause the circuit 100 to generate a different output voltage, for example from 240V RMS to 120V RMS, and the control loop is updated accordingly to update the signals at ports A1, B1, C1, D1, NA1, and NB1.

In some embodiments, the signals at ports NA1 and NB1 control switches S5 and S6 to generate a suitable signal at output 110 (e.g., $V_n$) that allows the circuit 100 to generate a desired output voltage while the switches of the second leg are switching at lower frequencies. Because the switches of the second leg are switched at lower frequencies, power dissipation may be reduced for generating a split-phase signal, compared to higher-frequency pulse-width modulation schemes (e.g., for an inverter that entirely switches at high frequencies to generate a split-phase signal). In some examples, because power dissipation is reduced, the corresponding device's thermal requirements may also be reduced (for example, heat sink size may be reduced).

It is understood that the control loop illustrated in FIG. 4 is exemplary. It should be appreciated that other control loops may be used to control circuit 100 and generate an output power signal. For example, a different controller and/or modulator may be used to enforce the voltage conditions. As another example, different voltage conditions may be used (e.g., $V_{an}$–$V_{bn}$ follows the reference voltage, but $V_{an}$+$V_{bn}$ does not equal 0V). Although the control loop illustrated in FIG. 4 is described with respect to controlling circuit 100, it should be appreciated that the control loop may be configured to provide control signals for other circuits to generate an output power signal.

Figure 5:
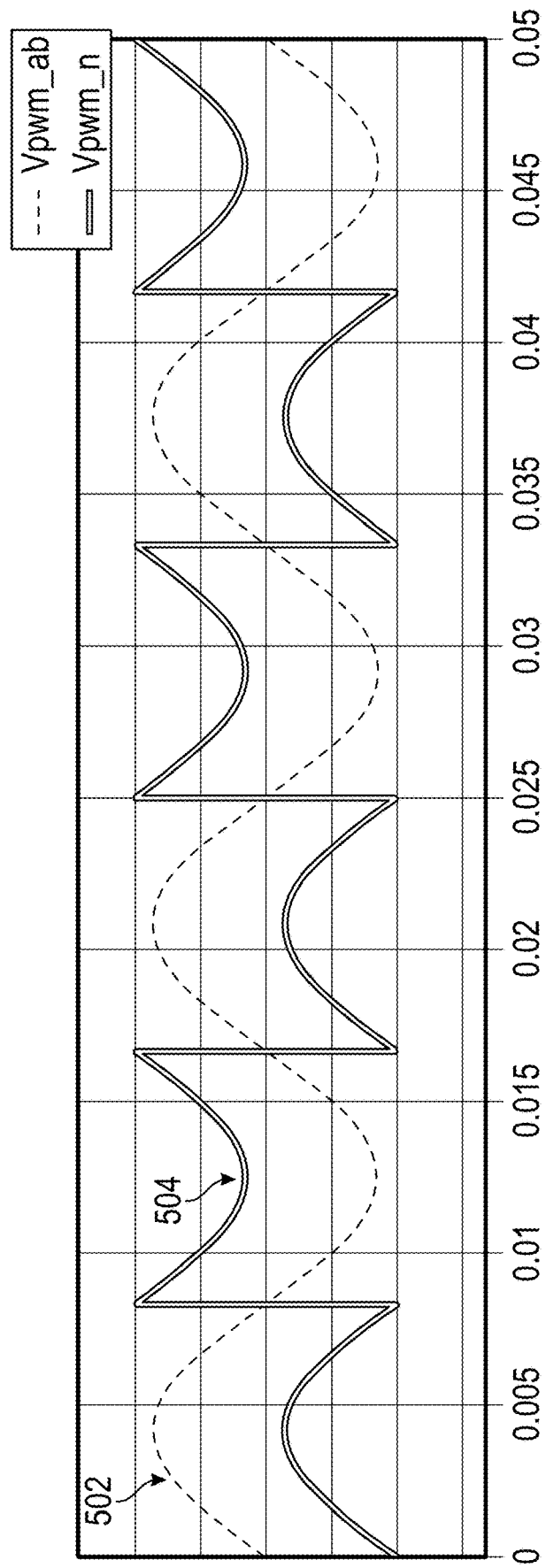
FIG. 5 illustrates example waveforms for controlling a circuit for generating an output power signal.

FIG. 5 illustrates example waveforms for controlling a circuit for generating an output power signal. In some embodiments, waveform 502 is a waveform of VPWM signal 410, and waveform 504 is a waveform of VPWM_N signal 412. These waveforms may be generated by the control loop described with respect to FIG. 4. As discussed with respect to FIG. 4, the waveform 502 may be compared with a carrier signal (e.g., a sawtooth signal at 50% duty cycle switching at 1 kHz-10 MHz) to generate signals 102A and 102B (which may be pulse-width modulated due to the comparison) to control switches S1 and S2, and the waveform 504 may be compared with the carrier signal to generate signals 106A and 106B (which may be pulse-width modulated due to the comparison) to control switches S5 and S6. The generated signals 102A, 102B, 106A, and 106B, along with signals 104A and 104B (e.g., square waves at 50% duty cycle following the positive/negative sign of VPWM signal 410 and hence, switching at 60 Hz), may control circuit 100 to generate a desired output power signal.

Figure 6A:
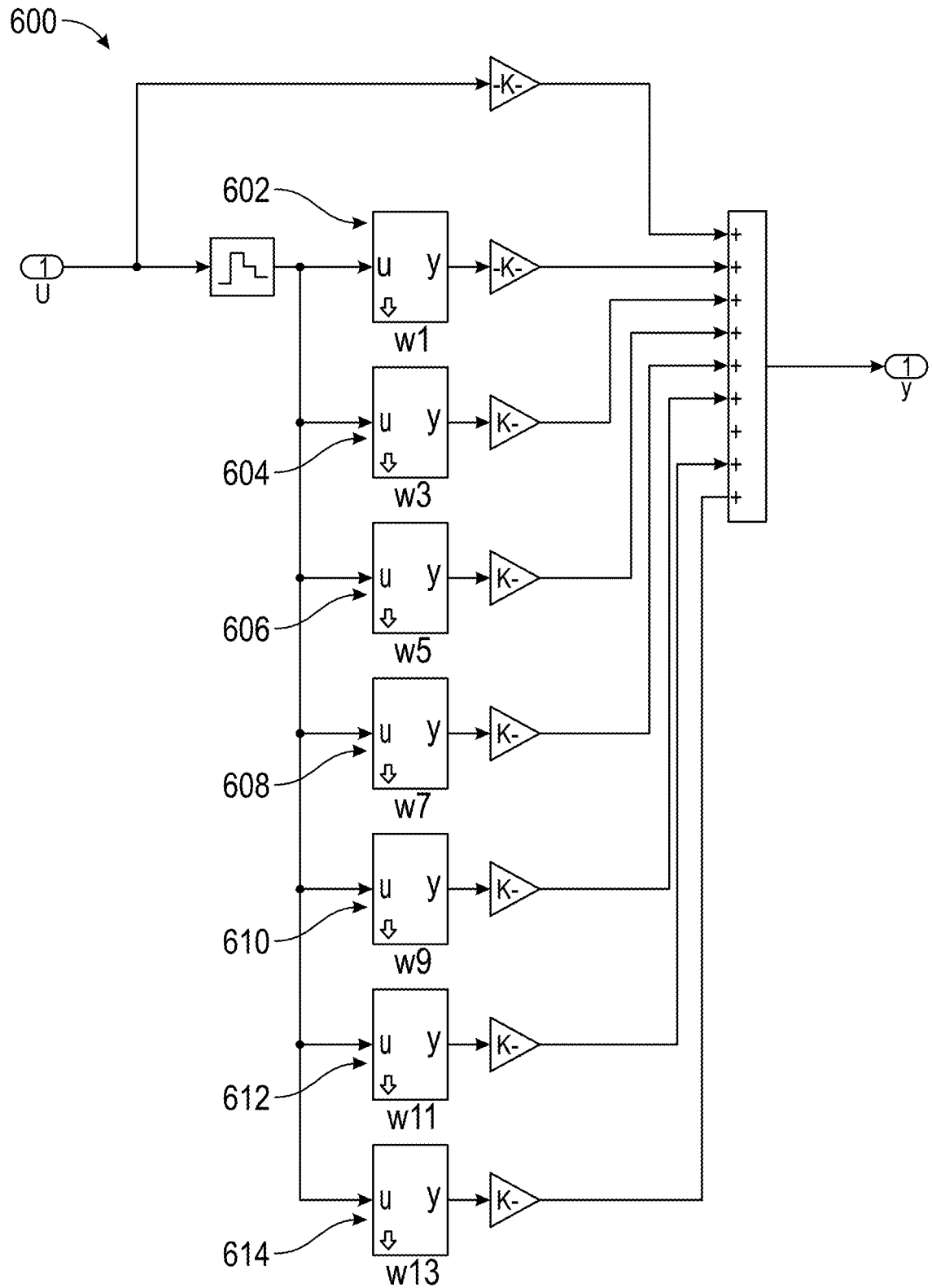
FIG. 6A illustrates an example diagram of a controller for controlling a circuit for generating an output power signal.

FIG. 6A illustrates an example diagram of a controller 600 for controlling a circuit for generating an output power signal. In some embodiment, the controller 600 is a PR controller. The controller 600 may be PR controller 418 and/or PR controller 422 described with respect to FIG. 4. In some embodiments, the PR controller 600 comprises a plurality of resonant controllers. For example, as illustrated, the PR controller 600 comprises resonant controllers at $1^{st}$ (corresponding to resonant controller 602), $3^{rd}$ (corresponding to resonant controller 604), $5^{th}$ (corresponding to resonant controller 606), $7^{th}$ (corresponding to resonant controller 608), $9^{th}$ (corresponding to resonant controller 610), $11^{th}$ (corresponding to resonant controller 612), and $13^{th}$ harmonics (corresponding to resonant controller 614). It should be appreciated that the controller 600 may comprise other harmonics for generating signals for controlling circuit 100.

Figure 6B:
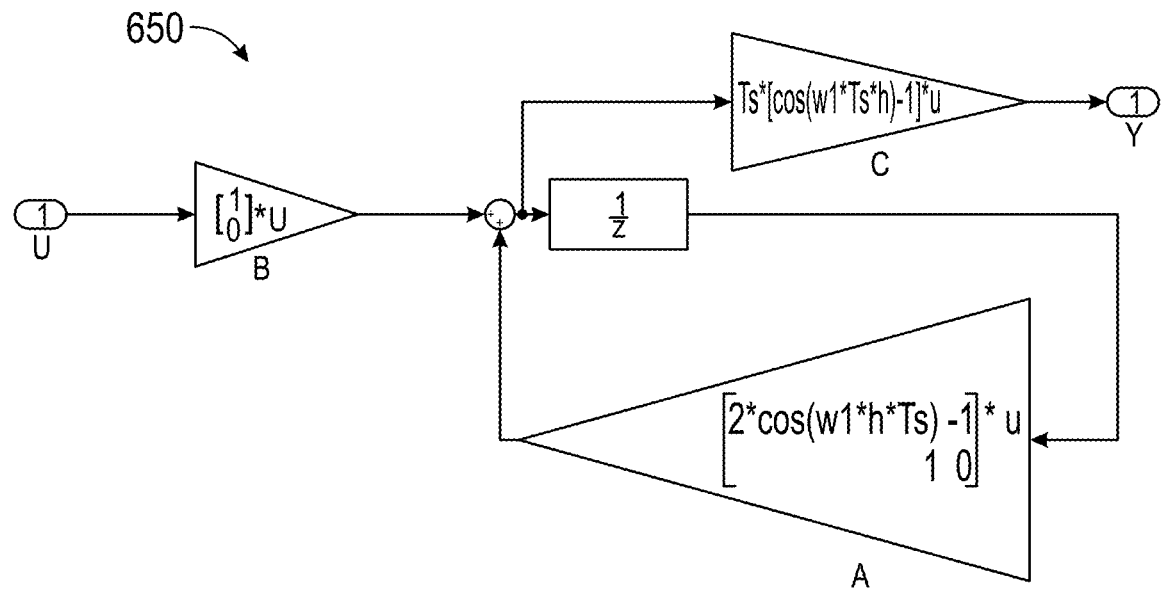
FIG. 6B illustrates an example diagram of a controller for controlling a circuit for generating an output power signal.

FIG. 6B illustrates an example diagram of a controller 650 for controlling a circuit for generating an output power signal. In some embodiments, the controller 650 is a resonant controller. One or more of resonant controllers 602-614 may comprise controller 650. In some embodiments, the relationship between an input U and output Y at the $h^{th}$ harmonic is defined as follows:

$$\begin{bmatrix} x1(k+1) \\ x2(k+1) \end{bmatrix} = \begin{bmatrix} 2\cos(h\omega_1 T_s) & -1 \\ 1 & 0 \end{bmatrix} \begin{bmatrix} x1(k) \\ x2(k) \end{bmatrix} + \begin{bmatrix} 1 \\ 0 \end{bmatrix} u(k) \quad (1)$$

$$y(k) = [\, T_s\cos(h\omega_1 T_s) \quad -1 \,] \begin{bmatrix} x1(k) \\ x2(k) \end{bmatrix} \quad (2)$$

In some embodiments, by using the disclosed PR controller in the control loop to generate signals for controlling circuit 100, $V_{ab}$, $V_{an}$, and $V_{bn}$ may be regulated within 0.1% of a desired value, and a total harmonic distortion voltage of less than 3% (of the desired output voltage) may be achieved under different loading conditions.

Figure 7:
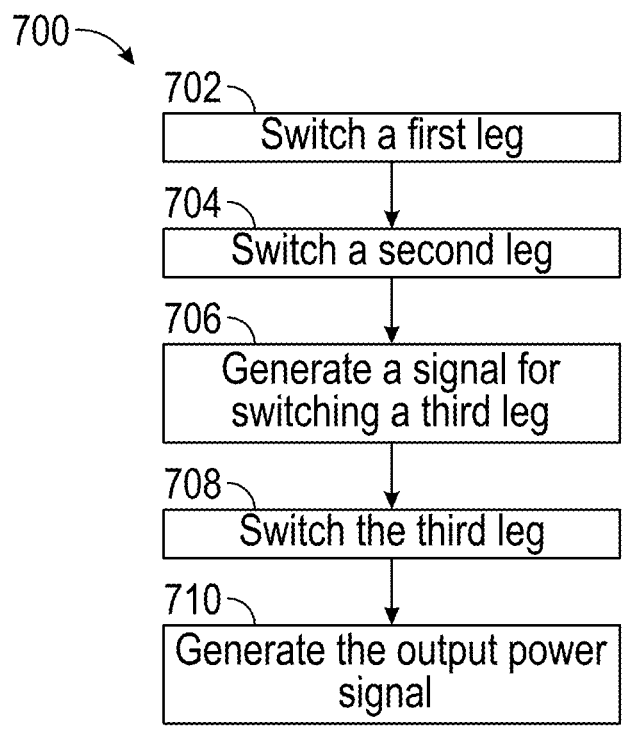
FIG. 7 is a flowchart illustrating steps of a method for generating an output power signal.

FIG. 7 is a flowchart illustrating steps of a method 700 for generating an output power signal. In some embodiments, the method 700 allows a power inverter or a circuit to provide a desired output power signal (e.g., a split-phase AC signal having a RMS voltage of 240V). In some embodiments, the method 700 allows the power inverter or circuit to operate in a more power efficient manner. In some embodiments, the method 700 is performed to operate circuit 100 for generating an output power signal to achieve the disclosed advantages. It should be appreciated that steps of method 700 leverage features and advantages described with respect to FIGS. 1-6B. In some embodiments, the steps of the 700 are performed simultaneously (e.g., generation of switch control signals via simultaneous comparison with carrier waveforms).

In some embodiments, the method 700 comprises switching, at a first frequency, a first leg comprising a first switch and a second switch of a first type to generate a first signal (step 702). For example, the switch S1 is switched by signal 102A, and the switch S2 is switched by signal 102B. The signals 102A and 102B are switching at a first frequency (e.g., 1 kHz-10 MHz) to generate a signal at node A of circuit 100.

In some embodiments, the method 700 comprises switching, at a second frequency, a second leg comprising a third switch and a fourth switch of a second type to generate a second signal (step 704). For example, the switch S3 is switched by signal 104A, and the switch S4 is switched by signal 104B. The signals 104A and 104B are switching at a second frequency (e.g., 60 Hz, a fundamental frequency, frequency of the output power signal, fundamental frequency of a power system) to generate a signal at node B of circuit 100.

In some embodiments, the method 700 comprises generating a neutral leg control signal for switching a third leg comprising a fifth switch and a sixth switch of a third type (step 706). For example, the signal 106A is generated (e.g., as described with respect to FIG. 4) for controlling switch S5, and the signal 106B is generated (e.g., as described with respect to FIG. 4) for controlling switch S6. In some embodiments, the neutral leg control signal is generated via a neutral leg modulation function (e.g., neutral leg modulation function 414). The signals 106A and 106B may be generated via a PR controller and/or a PI controller (e.g., of a control loop as described with respect to FIG. 4). In some embodiments, the PR controller (e.g., controller 600) comprises resonant controllers associated with $1^{st}\ 3^{rd}\ 5^{th}, 7^{th}\ 11^{th}$ and $13^{th}$ harmonics.

In some embodiments, generating the neutral leg control signal comprises causing a difference between the first signal and the second signal to follow a reference signal, wherein the reference signal corresponds to a desired level of the output power signal, and causing a sum of the first signal and the second signal to become zero. For example, as described with respect to FIG. 4, the signals 106A and/or 106B are generated via a control loop based on the voltage conditions (1) $V_{an}-V_{bn}$ follows the reference voltage (e.g., 240V RMS) and (2) $V_{an}+V_{bn}=0V$.

In some embodiments, a signal for controlling the first leg is generated via a carrier signal at the first frequency, and the neutral leg control signal for controlling the third leg is generated via the carrier signal. For example, as described with respect to FIG. 4, the signals 102A and/or 102B are generated by comparing the VPWM signal 410 and a carrier signal at the first frequency (of signals 102A and/or 102B), and the signals 106A and/or 106B are generated by comparing the VPWM_N signal 412 and the carrier signal.

In some embodiments, the method 700 comprises switching, by the neutral leg control signal, the third leg to generate a third signal (step 708). For example, the signal 106A switches switch S5 to generate a signal at node N of circuit 100, and the signal 106B switches switch S6 to generate a signal at node N of circuit 100.

In some embodiments, the method 700 comprises generating, based on the first signal, the second signal, and the fourth signal, the output power signal (step 710). For example, based on the signals at nodes A, B, and N, the circuit 100 generates $V_{ab}$. As a more specific example, based on the signals at nodes A and N, $V_{an}$ (voltage across outputs 108 and 110) may be generated, and based on signals at nodes B and N, $V_{bn}$ (voltage across outputs 112 and 110) may be generated. $V_{an}$ and $V_{bn}$ may be anti-phase 120V RMS AC signals. The superposition of $V_{an}$ and $V_{nb}$ forms a split-phase AC signal having a RMS voltage of 240V.

In some embodiments, the method 700 comprises receiving an input signal at the first, second, and third legs. For example, as described with respect to FIG. 1, the drains and sources of the switches of each leg of circuit 100 receive a DC voltage, and based on the signals 102A, 102B, 104A, 104B, 106A, and 106B, the circuit 100 outputs an AC voltage.

In some embodiments, the first frequency is higher than the second frequency. For example, the first frequency is 1 kHz-10 MHz, and the second frequency is e.g., 60 Hz, a fundamental frequency, frequency of the output power signal. In some embodiments, the first type of switches is configured to switch at the first frequency, and the second type of switches is configured to switch at the second frequency. For example, the first type of switches and the third type of switches are switches comprising Gallium Nitride, Silicon Carbide, a wide bandgap semiconductor, or combination thereof (which may be configured to be switched at the first frequency and/or the frequency of the neutral leg control signal), and the second type of switches is MOSFET (which may be configured to be switched at the second frequency).

Controlling the third leg with the neutral leg control signal allows the second leg to be switched at lower frequencies, reducing switching power dissipation when generating a desired output power signal (e.g., a split-phase AC signal having a RMS voltage of 240V) and allowing the second transistor to be a less costly device (e.g., a MOSFET, Silicon-based switch instead of a wide bandgap switch). In some examples, because power dissipation is reduced (compared to an inverter that entirely switches at high frequencies to generate a split-phase signal), the corresponding device's thermal requirements may also be reduced (for example, heat sink size may be reduced).

Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for generating an output power signal including the particular steps of the method of FIG. 7, this disclosure contemplates any suitable method for generating an output power signal including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Figure 8:
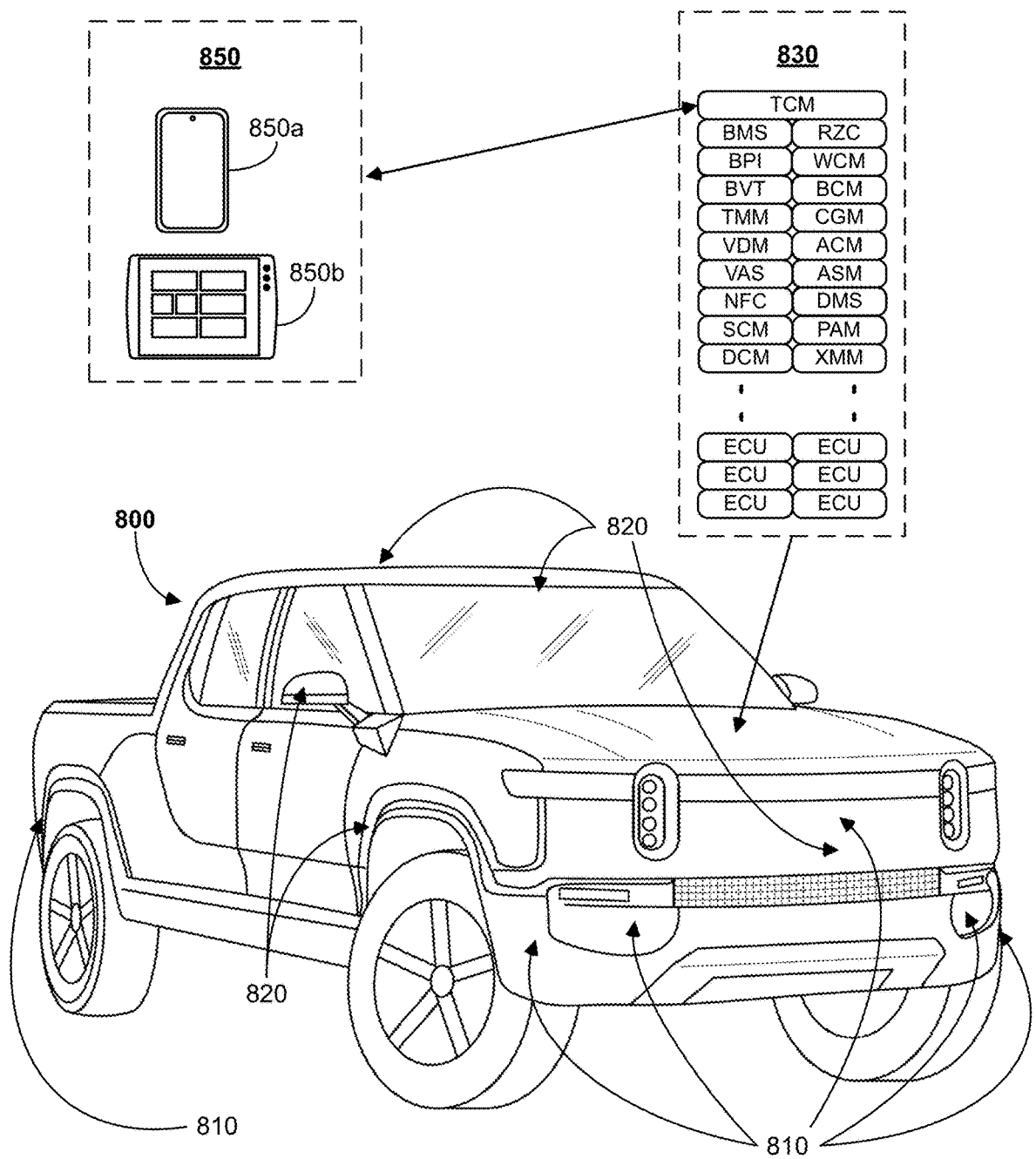
FIG. 8 illustrates an example vehicle.

FIG. 8 illustrates an example vehicle 800. Vehicle 800 may include multiple sensors 810, multiple cameras 820, and a control system 830. In some embodiments, vehicle 800 may be able to pair with a computing device 850 (e.g., smartphone 850a, tablet computing device 850b, or a smart vehicle accessory). As an example and not by way of limitation, a sensor 810 may be an accelerometer, a gyroscope, a magnometer, a global positioning satellite (GPS) signal sensor, a vibration sensor (e.g., piezoelectric accelerometer), a light detection and ranging (LiDAR) sensor, a radio detection and ranging (RADAR) sensor, an ultrasonic sensor, a temperature sensor, a pressure sensor, a humidity sensor, a chemical sensor, an electromagnetic proximity sensor, an electric current sensor, another suitable sensor, or a combination thereof. As an example and not by way of limitation, a camera 820 may be a still image camera, a video camera, a 3D scanning system (e.g., based on modulated light, laser triangulation, laser pulse, structured light, light detection and ranging (LiDAR)), an infrared camera, another suitable camera, or a combination thereof. Vehicle 800 may include various controllable components (e.g., doors, seats, windows, lights, HVAC, entertainment system, security system), instrument and information displays and/or interactive interfaces, functionality to pair a computing device 850 with the vehicle (which may enable control of certain vehicle functions using the computing device 850), and functionality to pair accessories with the vehicle, which may then be controllable through an interactive interface in the vehicle or through a paired computing device 850.

Control system 830 may enables control of various systems on-board the vehicle. As shown in FIG. 8, control system 830 may comprise one or more electronic control units (ECUs), each of which are dedicated to a specific set of functions. Each ECU may be a computer system (as described further in FIG. 10), and each ECU may include functionality provide by one or more of the example ECUs described below.

Features of embodiments as described herein may be controlled by one or more ECUs that provide functionality related to the battery pack of the vehicle. A Battery Management System (BMS) ECU may control and monitor a number of different aspects related to the electric vehicle battery system. Functions that may be controlled by the BMS may include, by way of example and not limitation, controlling the battery pack contactors and pre-charge relay, monitoring the high voltage connector, measuring the pack puncture sensor resistance and pack water sensor resistance, controlling the battery pack fans, measuring busbar temperature, communicating with the BPI and BVT ECUs, and calculate state-of-charge (SoC) and battery state-of-health (SoH). A Battery Power Isolation (BPI) ECU may provide high-voltage sensing, measure the battery pack current, and facilitate determination of pack isolation. A Balancing Voltage Temperature (BVT) ECU may monitor battery module cell voltages, monitor temperature, and execute cell balancing. The BMS ECU may control the connection between the battery and the circuit 100. For example, the BMS ECU may cause the battery to connect to the circuit 100 and provide a DC voltage to the circuit 100 for generating an AC voltage.

Features of embodiments as described herein may be controlled by a Telematics Control Module (TCM) ECU. The TCM ECU may provide a wireless vehicle communication gateway to support functionality such as, by way of example and not limitation, over-the-air (OTA) software updates, communication between the vehicle and the internet, communication between the vehicle and a computing device 850, in-vehicle navigation, vehicle-to-vehicle communication, communication between the vehicle and landscape features (e.g., automated toll road sensors, automated toll gates, power dispensers at charging stations), or automated calling functionality. The TCM ECU may facilitate communication between the vehicle and a device comprising the circuit 100. For example, the circuit 100 is configured for rectification. The TCM ECU communicates with the device comprising circuit 100 to allow the device to charge a battery of the vehicle.

Features of embodiments as described herein may be controlled by a Central Gateway Module (CGM) ECU. The CGM ECU may serve as the vehicle's communications hub that connects and transfer data to and from the various ECUs, sensors, cameras, motors, and other vehicle components. The CGM ECU may include a network switch that provides connectivity through Controller Area Network (CAN) ports, Local Interconnect Network (LIN) ports, and Ethernet ports. The CGM ECU may also serve as the master control over the different vehicle modes (e.g., road driving mode, parked mode, off-roading mode, tow mode, camping mode), and thereby control certain vehicle components related to placing the vehicle in one of the vehicle modes. In some embodiments, for electric vehicles, the CGM ECU may also control the vehicle charge port door and related light(s) and sensor(s). The vehicle may comprise a power inverter comprising the circuit 100. The CGM ECU may communicate with the power inverter to provide AC power. For example, in camping mode, the CGM ECU may enable the power inverter to provide AC power (for powering personal electronics, camping equipment).

Features of embodiments as described herein may be controlled by an Experience Management Module (XMM) ECU may generate a user interface displayed on a dashboard of the vehicle. The user interface may display information and provide audio output for an infotainment system, including various views around and inside the vehicle. XMM may provide interactive controls for a number of different vehicle functions that may be controlled in conjunction with enabling the designated mode, such as, by way of example and not limitation: controlling interior and exterior lighting, vehicle displays (e.g., instrument cluster, center information display, and rear console display), audio output (e.g., audio processing, echo cancellation, beam focusing), music playback, heating, ventilation, and air conditioning (HVAC) controls, power settings, Wi-Fi connectivity, Bluetooth device connectivity, and vehicle leveling, as well as displaying information in the user interface (e.g., surround view camera feed, distance to nearest charger, and minimum range). In some embodiments, interactive controls provided by XMM may enable interaction with other modules of control system 830. In some embodiments, functions of the ACM and the XMM may be combined together into an Autonomous eXperience Module (AXM) ECU. The vehicle may comprise a power inverter comprising the circuit 100, and a user may enable the power inverter (e.g., for powering personal electronics configured to receive an AC voltage) via the XMM ECU.

Vehicle 800 may include one or more additional ECUs, such as, by way of example and not limitation: a Vehicle Dynamics Module (VDM) ECU, a Vehicle Access System (VAS) ECU, a Near-Field Communication (NFC) ECU, a Body Control Module (BCM) ECU, a Seat Control Module (SCM) ECU, a Door Control Module (DCM) ECU, a Rear Zone Control (RZC) ECU, an Autonomy Control Module (ACM) ECU, an Autonomous Safety Module (ASM) ECU, a Driver Monitoring System (DMS) ECU, and/or a Winch Control Module (WCM) ECU. If vehicle 800 is an electric vehicle, one or more ECUs may provide functionality related to the battery pack of the vehicle, such as a Battery Management System (BMS) ECU, a Battery Power Isolation (BPI) ECU, a Balancing Voltage Temperature (BVT) ECU, and/or a Thermal Management Module (TMM) ECU.

Figure 9:
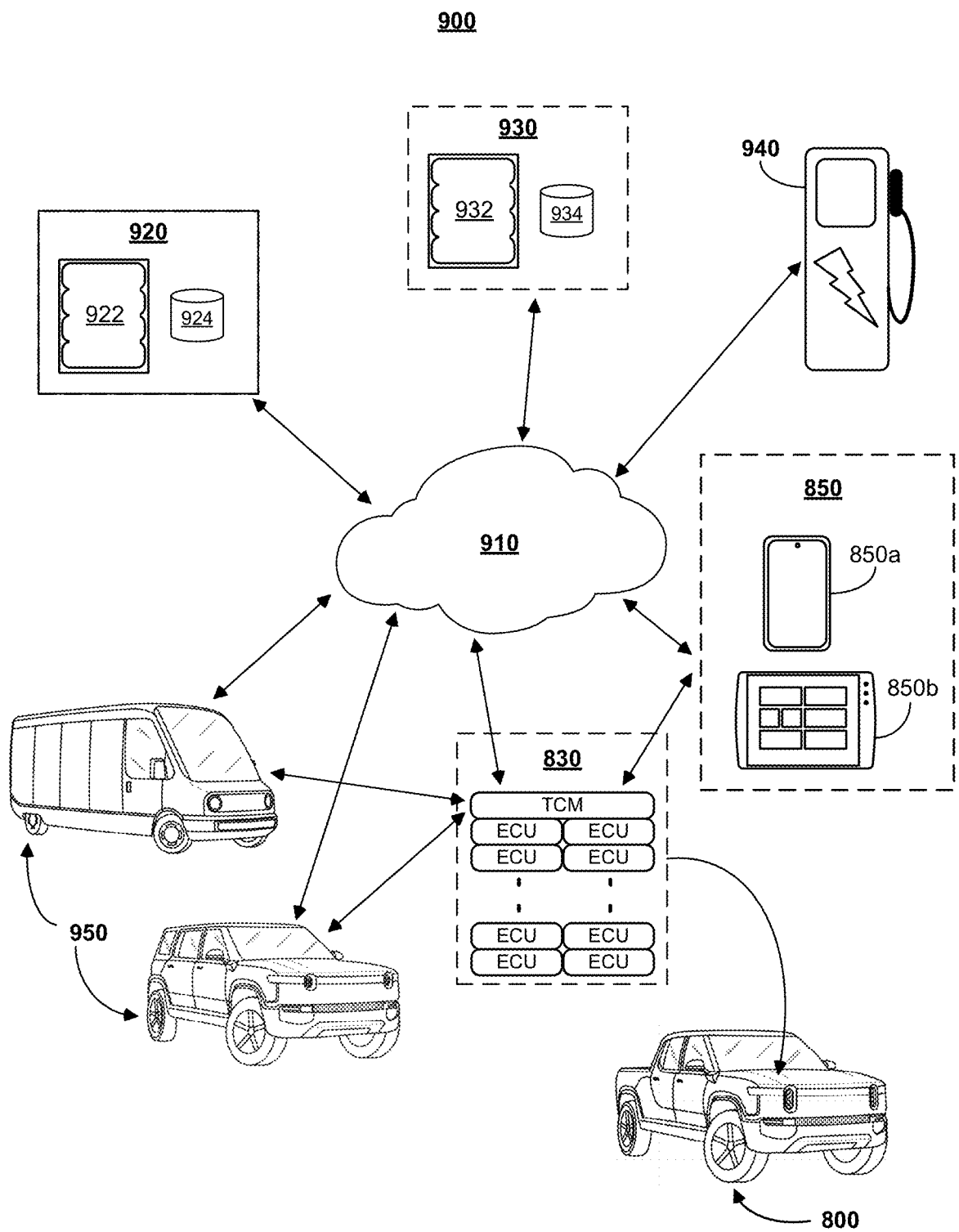
FIG. 9 illustrates an example network system including a connected vehicle.

FIG. 9 illustrates an example networked environment 900. Computer system 900 may include a connected vehicle 800 with a control system 830 that is capable of transmitting data to/from a network 910. Network 910 may also be connected to one or more computing servers 920 (e.g., including compute units 922 and storage units 924) associated with a vehicle manufacturer, a vehicle service provider, a vehicle fleet operator, or a vehicle-charging facility provider. Network 910 may also be connected to one or more third-party computing servers 930 (e.g., including compute units 932 and storage units 934) associated with, for example, a smart accessory manufacturer, a group event organizer, service provider, or a governmental organization. Networked environment 900 may include one or more landscape features 940 (e.g., automated toll road sensors, smart road signs or road markers, automated toll gates, power dispensers at charging stations). Networked environment 900 may also include other connected vehicles 950 that may be capable of communicating with vehicle 800 through network 910 and/or directly with vehicle 800 (e.g., by communicating with a TCM ECU of a control system 830 of vehicle 800 when connected vehicle 950 is within range of a short-range communications network, such as Bluetooth). Networked environment 900 may also include one or more computing devices 850 (e.g., smartphone 850*a*, a tablet computing device 850*b*, or a smart vehicle accessory) capable of communicating with network 910 and/or directly with vehicle 800. For example, the vehicle 800 may receive updated instructions for controlling the circuit 100 via the network 910. As an example, the updated instructions may comprise instructions for configuring the control loop for more power efficient and/or accurate output power signal generation. As another example, the updated instructions may comprise instructions for configuring the control loop for generating different output power signals (e.g., signals other than a split-phase 240V RMS signal).

Networked environment 900 may enable transmission of data and communications between any of the depicted elements. In some embodiments, such information may be communicated in one direction (e.g., a smart road sign broadcasting information related to traffic control or delays due to construction); in other embodiments, information may include two-way communications (e.g., an automated toll gate that processes a request received from vehicle 800 to deduct a toll from a specified account and provides confirmation of the transaction). In particular embodiments, one or more elements of networked environment 900 may include one or more computer systems, as described in further detail with respect to FIG. 10A. In particular embodiments, one or more elements of networked environment 900 perform one or more steps of one or more methods described or illustrated herein. In particular embodiments, software running on one or more elements of networked environment 900 may be controlled by a single entity to perform one or more steps of one or more methods described or illustrated herein or provide functionality described or illustrated herein.

Figures 10A, 10B:
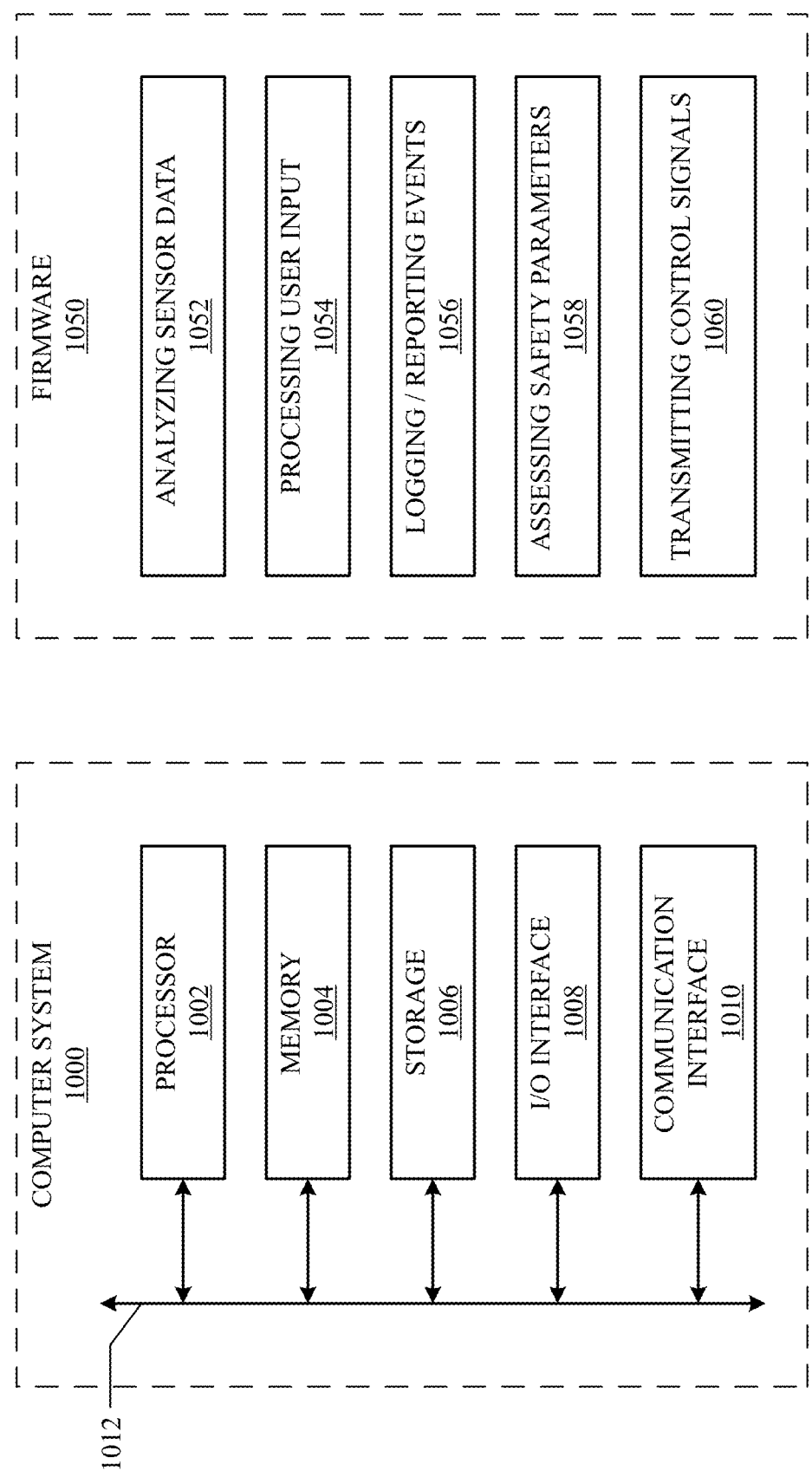
FIG. 10A is a schematic of an example computer system.
FIG. 10B illustrates example firmware for a vehicle ECU.

FIG. 10A illustrates an example computer system 1000. In some embodiments, the circuit 100 is integrated as part of a computer system 1000. In some embodiments, a computer system 1000 is electrically coupled to a circuit 100 for controlling the circuit 100. Computer system 1000 may include a processor 1002, memory 1004, storage 1006, an input/output (I/O) interface 1008, a communication interface 1010, and a bus 1012. Although this disclosure describes one example computer system including specified components in a particular arrangement, this disclosure contemplates any suitable computer system with any suitable number of any suitable components in any suitable arrangement. As an example and not by way of limitation, computer system 1000 may be an electronic control unit (ECU), an embedded computer system, a system-on-chip, a single-board computer system, a desktop computer system, a laptop or notebook computer system, a mainframe, a mesh of computer systems, a mobile telephone, a personal digital assistant, a server computing system, a tablet computer system, or a combination of two or more of these. Where appropriate, computer system 1000 may include one or more computer systems 1000; be unitary or distributed, span multiple locations, machines, or data centers; or reside in a cloud, which may include one or more cloud components in one or more networks. Where appropriate, computer system(s) 1000 may perform, at different times or at different locations, in real time or in batch mode, one or more steps of one or more methods described or illustrated herein.

Processor 1002 (e.g., compute units 922 and 932) may include hardware for executing instructions, such as those making up a computer program. As an example and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006 (e.g., storage units 924 and 934). Processor 1002 may include one or more internal caches for data, instructions, or addresses.

In particular embodiments, memory 1004 includes main memory for storing instructions for processor 1002 to execute or data for processor 1002 to operate on. In particular embodiments, one or more memory management units (MMUs) reside between processor 1002 and memory 1004 and facilitate accesses to memory 1004 requested by processor 1002. In particular embodiments, memory 1004 includes random access memory (RAM). This disclosure contemplates any suitable RAM.

In particular embodiments, storage 1006 includes mass storage for data or instructions. As an example and not by way of limitation, storage 1006 may include a removable disk drive, flash memory, an optical disc, a magneto-optical disc, magnetic tape, or a Universal Serial Bus (USB) drive or two or more of these. Storage 1006 may include removable or fixed media and may be internal or external to computer system 1000. Storage 1006 may include any suitable form of non-volatile, solid-state memory or read-only memory (ROM).

In particular embodiments, I/O interface 1008 includes hardware, software, or both, providing one or more interfaces for communication between computer system 1000 and one or more input and/or output (I/O) devices. Computer system 1000 may be communicably connected to one or more of these I/O devices, which may be incorporated into, plugged into, paired with, or otherwise communicably connected to vehicle 800 (e.g., through the TCM ECU). An input device may include any suitable device for converting volitional user input into digital signals that can be processed by computer system 1000, such as, by way of example and not limitation, a steering wheel, a touch screen, a microphone, a joystick, a scroll wheel, a button, a toggle, a switch, a dial, or a pedal. An input device may include one or more sensors for capturing different types of information, such as, by way of example and not limitation, sensors 810 described above. An output device may include devices designed to receive digital signals from computer system 1000 and convert them to an output format, such as, by way of example and not limitation, speakers, headphones, a display screen, a heads-up display, a lamp, a smart vehicle accessory, another suitable output device, or a combination thereof. This disclosure contemplates any suitable I/O devices and any suitable I/O interfaces 1008 for them. I/O interface 1008 may include one or more I/O interfaces 1008, where appropriate.

In particular embodiments, communication interface 1010 includes hardware, software, or both providing one or more interfaces for data communication between computer system 1000 and one or more other computer systems 1000 or one or more networks. Communication interface 1010 may include one or more interfaces to a controller area network (CAN) or to a local interconnect network (LIN). Communication interface 1010 may include one or more of a serial peripheral interface (SPI) or an isolated serial peripheral interface (isoSPI). In some embodiments, communication interface 1010 may include a network interface controller (NIC) or network adapter for communicating with an Ethernet or other wire-based network or a wireless NIC (WNIC) or wireless adapter for communicating with a wireless network, such as a WI-FI network or a cellular network.

In particular embodiments, bus 1012 includes hardware, software, or both coupling components of computer system 1000 to each other. Bus 1012 may include any suitable bus, as well as one or more buses 1012, where appropriate. Although this disclosure describes a particular bus, any suitable bus or interconnect is contemplated.

Herein, a computer-readable non-transitory storage medium or media may include one or more semiconductor-based or other integrated circuits (ICs) (such, as for example, field-programmable gate arrays or application-specific ICs), hard disk drives, hybrid hard drives, optical discs, optical disc drives, magneto-optical discs, magneto-optical drives, solid-state drives, RAM drives, any other suitable computer-readable non-transitory storage media, or any suitable combination. A computer-readable non-transitory storage medium may be volatile, non-volatile, or a combination of volatile and non-volatile, where appropriate.

FIG. 10B illustrates example firmware 1050 for a vehicle ECU 1000 as described with respect to control system 830. Firmware 1050 may include functions 1052 for analyzing sensor data based on signals received from sensors 810 or cameras 820 received through communication interface 1010. Firmware 1050 may include functions 1054 for processing user input (e.g., directly provided by a driver of or passenger in vehicle 800, or provided through a computing device 850) received through I/O interface 1008. Firmware 1050 may include functions 1056 for logging detected events (which may be stored in storage 1006 or uploaded to the cloud), as well as functions for reporting detected events (e.g., to a driver or passenger of the vehicle through an instrument display or interactive interface of the vehicle, or to a vehicle manufacturer, service provider, or third party through communication interface 1010). Firmware 1050 may include functions 1058 for assessing safety parameters (e.g., monitoring the temperature of a vehicle battery or the distance between vehicle 800 and nearby vehicles). Firmware 1050 may include functions 1060 for transmitting control signals to components of vehicle 800, including other vehicle ECUs 1000.

In some embodiments, a method for generating a split-phase power signal, via a power converter comprising a first leg, a second leg, and a third leg, comprises: switching, at a first frequency, the first leg comprising a first switch and a second switch of a first type to generate a first signal; switching, at a second frequency, the second leg comprising a third switch and a fourth switch of a second type to generate a second signal. The first frequency is higher than the second frequency, the second frequency is associated with a fundamental frequency of a power system, the first type of switch is configured to switch at the first frequency, and the second type of switch is configured to switch at the second frequency. The method further comprises generating a neutral leg control signal for switching the third leg comprising a fifth switch and a sixth switch of a third type; switching, by the neutral leg control signal, the third leg to generate a third signal; and generating, based on the first signal, the second signal, and the third signal, the split-phase power signal.

In some embodiments, the neutral control leg signal is generated via a neutral leg modulation function based on a line-to-line pulse-width modulation voltage and a polarity of the line-to-line pulse-width modulation voltage.

In some embodiments, the neutral leg modulation function comprises (Vpwm_ab/Vdc)–sign(Vpwm_ab), Vpwm_ab is the line-to-line pulse-width modulation voltage, and Vdc is a measured DC bus voltage.

In some embodiments, the split-phase power signal comprises a superposition of the first, second, and third signals.

In some embodiments, the neutral leg control signal is generated via a Proportional-Resonant (PR) controller.

In some embodiments, the neutral leg control signal is generated via a Proportional-Integral (PI) controller.

In some embodiments, the first type of switch and the third type of switch are wide-band-gap semiconductor devices.

In some embodiments, the second type of switch is metal-oxide-semiconductor field effect transistor (MOSFET), insulated-gate bipolar transistor, or any combination thereof.

In some embodiments, the first frequency is 15-200000 times higher than the second frequency.

In some embodiments, a frequency of the neutral leg control signal is 1 kHz-10 MHz.

In some embodiments, a root mean square voltage of the split-phase power signal is 240V.

In some embodiments, the method further comprises receiving an input signal at the first, second, and third legs.

In some embodiments, the input signal is 350V.

In some embodiments, generating the neutral leg control signal comprises: causing a difference between the first signal and the second signal to follow a reference signal, wherein the reference signal corresponds to a desired level of the split-phase power signal; and causing a sum of the first signal and the second signal to become zero.

In some embodiments, a signal for controlling the first leg is generating via a carrier signal at the first frequency, and the neutral leg control signal is generated via the carrier signal.

In some embodiments, the second frequency is 50-60 Hz.

In some embodiments, a power converter circuit for generating a split-phase power signal comprises: a first leg comprising a first switch and a second switch of a first type. The first leg is configured to be switched at a first frequency to generate a first signal, and the first type of switch is configured to switch at the first frequency. The power convert circuit further comprises a second leg comprising a third switch and a fourth switch of a second type. The second leg is configured to be switched at a second frequency to generate a second signal, the second type of switch is configured to switch at the second frequency, the first frequency is higher than the second frequency, and the second frequency is associated with a fundamental frequency of a power system. The power converter circuit further comprises a third leg comprising fifth switch and a sixth switch of a third type. The third leg is configured to be switched by a neutral leg control signal, and the split-phase power signal is generated based on the first signal, the second signal, and the third signal.

In some embodiments, the neutral control leg signal is generated via a neutral leg modulation function based on a line-to-line pulse-width modulation voltage and a polarity of the line-to-line pulse-width modulation voltage.

In some embodiments, an electric vehicle comprises a power converter circuit for generating a split-phase power signal. The power converter circuit comprises: a first leg comprising a first switch and a second switch of a first type. The first leg is configured to be switched at a first frequency to generate a first signal, and the first type of switch is configured to switch at the first frequency. The power convert circuit further comprises a second leg comprising a third switch and a fourth switch of a second type. The second leg is configured to be switched at a second frequency to generate a second signal, the second type of switch is configured to switch at the second frequency, the first frequency is higher than the second frequency, and the second frequency is associated with a fundamental frequency of a power system. The power converter circuit further comprises a third leg comprising fifth switch and a sixth switch of a third type. The third leg is configured to be switched by a neutral leg control signal, and the split-phase power signal is generated based on the first signal, the second signal, and the third signal.

In some embodiments, the neutral control leg signal is generated via a neutral leg modulation function based on a line-to-line pulse-width modulation voltage and a polarity of the line-to-line pulse-width modulation voltage.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A method for generating a split-phase power signal via a power converter comprising a first leg, a second leg, and a third leg, wherein the method comprises:
   switching, at a first frequency, the first leg comprising a first switch and a second switch of a first type to generate a first signal;
   switching, at a second frequency, the second leg comprising a third switch and a fourth switch of a second type to generate a second signal, wherein:
      the first frequency is higher than the second frequency,
      the second frequency is associated with a fundamental frequency of a power system,
      the first type of switch is configured to switch at the first frequency, and the second type of switch is configured to switch at the second frequency;
   generating a neutral leg control signal for switching the third leg comprising a fifth switch and a sixth switch of a third type;
   switching, by the neutral leg control signal, the third leg to generate a third signal; and
   generating, based on the first signal, the second signal, and the third signal, the split-phase power signal.

2. The method of claim 1, wherein the neutral control leg signal is generated via a neutral leg modulation function based on a line-to-line pulse-width modulation voltage and a polarity of the line-to-line pulse-width modulation voltage.

3. The method of claim 2, wherein:
   the neutral leg modulation function comprises $(V_{pwm\_ab}/V_{dc})-\text{sign}(V_{pwm\_ab})$,
   $V_{pwm\_ab}$ is the line-to-line pulse-width modulation voltage, and
   $V_{dc}$ is a measured DC bus voltage.

4. The method of claim 1, wherein the split-phase power signal comprises a superposition of the first, second, and third signals.

5. The method of claim 1, wherein the neutral leg control signal is generated via a Proportional-Resonant (PR) controller.

6. The method of claim 1, wherein the neutral leg control signal is generated via a Proportional-Integral (PI) controller.

7. The method of claim 1, wherein the first type of switch and the third type of switch are wide-band-gap semiconductor devices.

8. The method of claim 1, wherein the second type of switch is metal-oxide-semiconductor field effect transistor (MOSFET), insulated-gate bipolar transistor, or any combination thereof.

9. The method of claim 1, wherein the first frequency is 15-200000 times higher than the second frequency.

10. The method of claim 1, wherein a frequency of the neutral leg control signal is 1 kHz-10 MHz.

11. The method of claim 1, wherein a root mean square voltage of the split-phase power signal is 240V.

12. The method of claim 1, further comprising receiving an input signal at the first, second, and third legs.

13. The method of claim 12, wherein the input signal is 350V.

14. The method of claim 1, wherein generating the neutral leg control signal comprises:
   causing a difference between the first signal and the second signal to follow a reference signal, wherein the reference signal corresponds to a desired level of the split-phase power signal; and
   causing a sum of the first signal and the second signal to become zero.

15. The method of claim 1, wherein:
a signal for controlling the first leg is generating via a carrier signal at the first frequency, and
the neutral leg control signal is generated via the carrier signal.

16. The method of claim 1, wherein the second frequency is 50-60 Hz.

17. A power converter circuit for generating a split-phase power signal, comprising:
a first leg comprising a first switch and a second switch of a first type, wherein:
the first leg is configured to be switched at a first frequency to generate a first signal, and
the first type of switch is configured to switch at the first frequency;
a second leg comprising a third switch and a fourth switch of a second type, wherein:
the second leg is configured to be switched at a second frequency to generate a second signal,
the second type of switch is configured to switch at the second frequency, the first frequency is higher than the second frequency, and
the second frequency is associated with a fundamental frequency of a power system; and
a third leg comprising fifth switch and a sixth switch of a third type, wherein:
the third leg is configured to be switched by a neutral leg control signal, and
the split-phase power signal is generated based on the first signal, the second signal, and a third signal.

18. The power converter circuit of claim 17, wherein the neutral control leg signal is generated via a neutral leg modulation function based on a line-to-line pulse-width modulation voltage and a polarity of the line-to-line pulse-width modulation voltage.

19. An electric vehicle comprising a power converter circuit for generating a split-phase power signal, wherein the power converter comprises:
a first leg comprising a first switch and a second switch of a first type, wherein:
the first leg is configured to be switched at a first frequency to generate a first signal, and
the first type of switch is configured to switch at the first frequency;
a second leg comprising a third switch and a fourth switch of a second type, wherein:
the second leg is configured to be switched at a second frequency to generate a second signal,
the second type of switch is configured to switch at the second frequency,
the first frequency is higher than the second frequency, and
the second frequency is associated with a fundamental frequency of a power system; and
a third leg comprising fifth switch and a sixth switch of a third type, wherein:
the third leg is configured to be switched by a neutral leg control signal, and
the split-phase power signal is generated based on the first signal, the second signal, and a third signal.

20. The electric vehicle of claim 19, wherein the neutral control leg signal is generated via a neutral leg modulation function based on a line-to-line pulse-width modulation voltage and a polarity of the line-to-line pulse-width modulation voltage.

* * * * *